United States Patent [19]

Sasa

[11] Patent Number: 4,998,278

[45] Date of Patent: Mar. 5, 1991

[54] METHOD AND APPARATUS FOR SCRAMBLE TYPE BROADCAST RECEIVING WITH CONTRACT MANAGEMENT AND SCRAMBLE TYPE BROADCASTING SYSTEM

[75] Inventor: Kiyokazu Sasa, Yokohama, Japan

[73] Assignee: Kabushiki Kaisha Toshiba, Kawasaki, Japan

[21] Appl. No.: 330,061

[22] Filed: Mar. 29, 1989

[30] Foreign Application Priority Data

Mar. 29, 1988 [JP] Japan ................................. 63-73345

[51] Int. Cl.⁵ ............................................ H04K 1/00
[52] U.S. Cl. ............................................ 380/23; 380/20
[58] Field of Search ........................ 380/20, 21, 10, 23; 358/86

[56] References Cited

U.S. PATENT DOCUMENTS

| 4,388,643 | 6/1983 | Aminetzah ............................ 380/20 |
| 4,536,791 | 8/1985 | Campbell et al. ...................... 380/20 |
| 4,677,434 | 6/1987 | Fascenda .............................. 380/23 |
| 4,792,973 | 12/1988 | Gilhousen et al. ............... 380/23 X |
| 4,866,770 | 9/1989 | Seth-Smith et al. ................. 380/20 |

OTHER PUBLICATIONS

Kitagawa et al., "Digital Cable Audio System", Toshiba Review UDC 681.327.8: 654:195.2; 1985, pp. 101–104.

Primary Examiner—Thomas H. Tarcza
Assistant Examiner—Tod Swann
Attorney, Agent, or Firm—Foley & Lardner, Schwartz, Jeffery, Schwabb, Mack, Blumenthal & Evans

[57] ABSTRACT

A method and an apparatus for scramble type broadcast receiving capable of proper contract management and strict prevention of illegitimate program receptions. The method includes the steps of deciphering the stored cryptogrammed contract information whenever the program information is received: temporarily storing the deciphered contract information: and de-scrambling the scrambled actual program in accordance with the status of the contract indicated by the deciphered contract information. The apparatus for performing the method and the broadcast system incorporating the method and apparatus are also disclosed.

16 Claims, 11 Drawing Sheets

METHOD AND APPARATUS FOR SCRAMBLE TYPE BROADCAST RECEIVING WITH CONTRACT MANAGEMENT AND SCRAMBLE TYPE BROADCASTING SYSTEM

BACKGROUND OF THE INVENTION

1. Field of the Invention

The present invention relates to a method and an apparatus for broadcast receiving of a contract-based scramble type broadcast system and, in particular, such a method and an apparatus capable of contract management.

2. Description of the Background Art

A contract-based scramble type broadcasting utilizing a satellite station has been in the course of development. In such a broadcasting system, part of broadcast signals concerning the actual programs are scrambled but also accompanied by data required for de-scrambling the broadcast signals, so that only those who hold a valid contract can receive the broadcast by de-scrambling the broadcast signals with these required data.

Figure 1A:
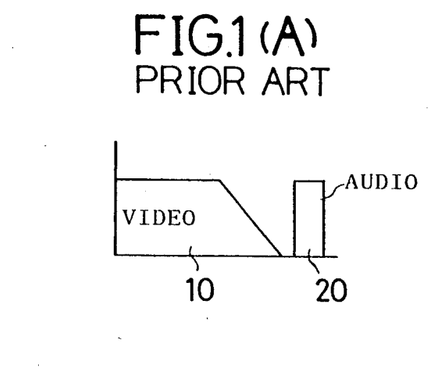
FIG. 1(A), (B), (C), and (D) are diagrammatic illustrations of general scramble type broadcast signal, audio signal, program information, and contract information, respectively.
Figure 1B:
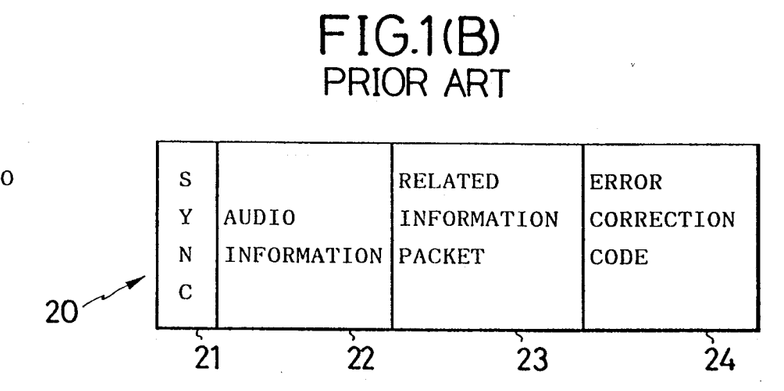

The broadcast signal for such a broadcasting system is shown in FIG. 1(A), which comprises a video signal 10 and a audio signal 20. This audio signal 20 further comprises a synchronization code 21, an audio information 22, a related information packet 28, and an error correction code 24, as shown in FIG. 1(B). Such a broadcast signal is converted into codes by an encoder, transmitted from a broadcast station through the satellite station, and received by a receiver with a decoder for re-converting the broadcast signal from the codes.

The related information packet 28 contains related information, of which those concerning contracts are referred to as contract information whereas those concerning program and the data for de-scrambling the broadcast signal are referred to as a program information. These contract information and program information in the related information packet 23 are cryptogrammed for protection.

Figure 1C:
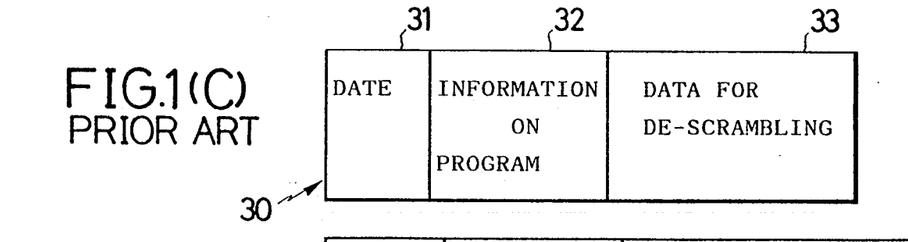

The program information 30 shown in FIG. 1(C) contains information on date of broadcasting 31, on program 32 including such information as a price of the program, a program number, and a category of the program, and the data for de-scrambling 33. This program information 30 will be transmitted from the broadcast station in every second, for example.

Figure 1D:
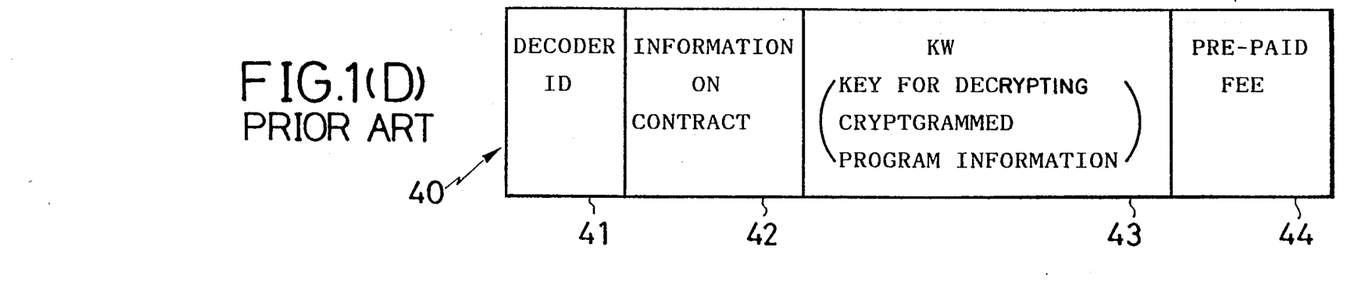

The contract information 40 shown in FIG. 1(D) contains information on ID of the decoder 41, on contract 42 including such information as a validation date and contracted programs, a program key Kw for deciphering the cryptogrammed program information 43, and on pre-paid fee 44. This contract information 40 will be transmitted from the broadcast station once every month, for example.

Figure 2:
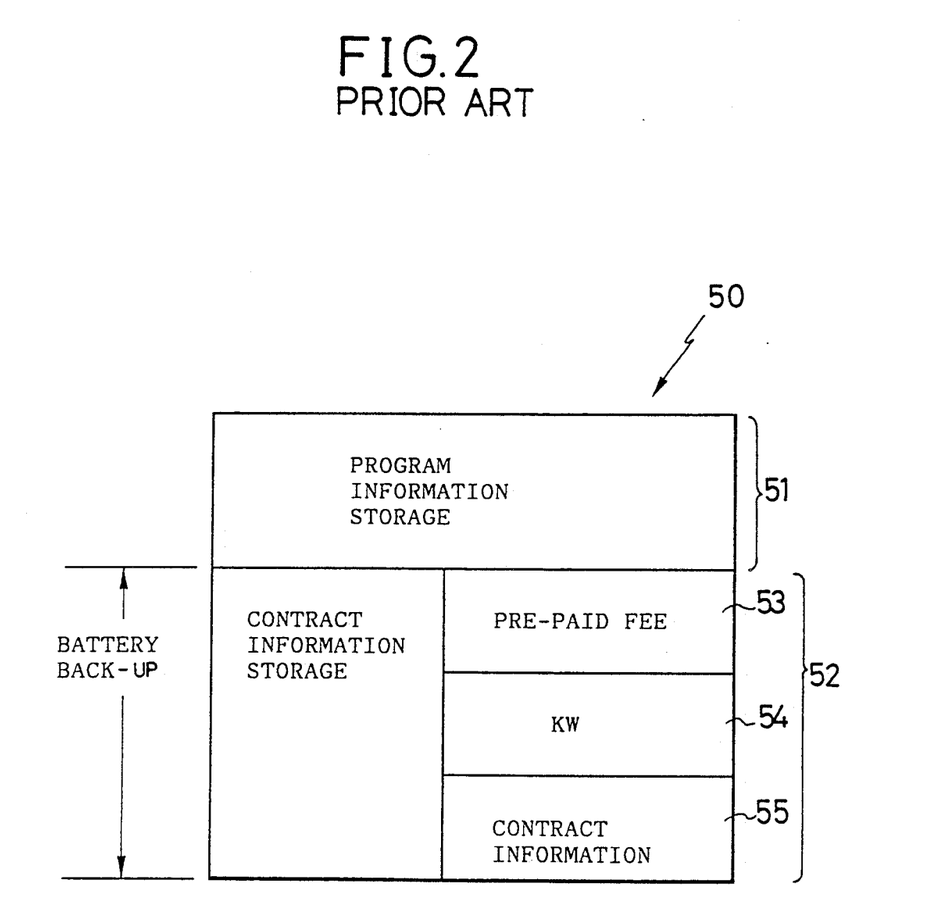
FIG. 2 is a diagrammatic illustration of a memory space to be utilized by a conventional scramble type broadcast receiver.

Conventionally, the decoder possesses a contract key Km for deciphering the cryptogrammed contract information 40, so that when the contract information 40 is received the cryptogrammed contract information 40 is deciphered by using this contract key Km, and the deciphered contract information is stored in a memory which is backed-up by a battery. A memory space 50 of such a memory is shown in FIG. 2, where there are program information storage 51, and a contract information storage 52 containing a room 53 for the pre-paid fee, a room 54 for the program key Kw, and a room 55 for contract information. As indicated in FIG. 2, the contract information storage 52 is battery backed-up so that the contract information 40 will not be lost accidentally.

Then, when the program information 30 is received a decision is made as to whether to allow the program to be received and consequently to de-scramble the actual program or not, in accordance with the stored contract information 40.

Figure 3:
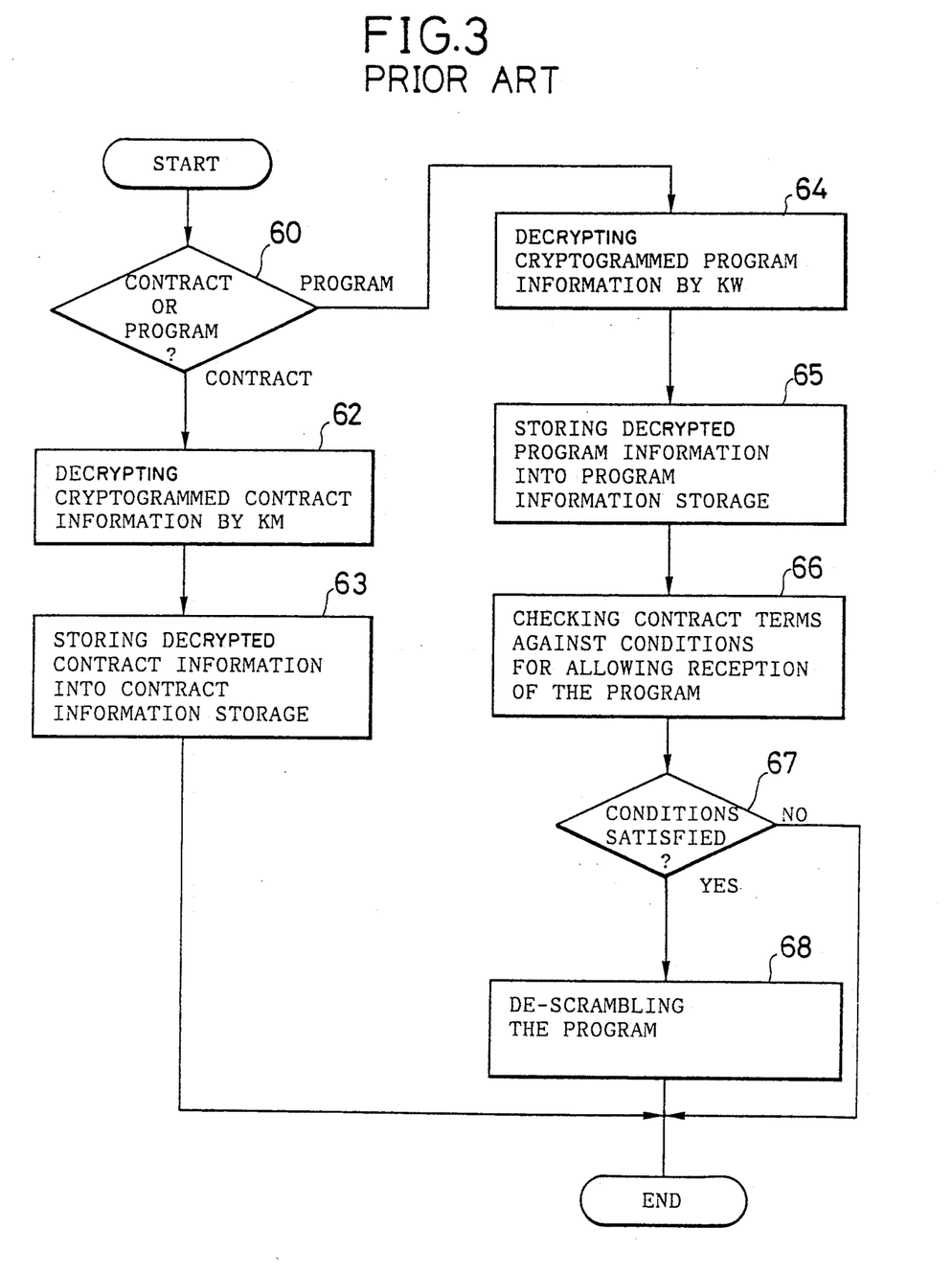
FIG. 3 is a flow chart for the operation of contract management by the conventional scramble type broadcast receiver.

A flow chart for such a process of contract management is shown in FIG. 5, which is to be carried out by a microcomputer installed in the decoder.

First, at the step 60, the program information 30 and the contract information 40 in the received related packet information 23 are distinguished from each other. For the contract information 40, the step 62 will be taken next at which the cryptogrammed contract information 40 is deciphered by the contract key Km, and then at the step 63 the deciphered contract information 40 is stored into the contract information storage 52. On the other hand, for the program information 30, the step 64 will be taken next at which the cryptogrammed program information 30 is deciphered by the program key Kw. The deciphered program information 30 is stored into the program information storage 51 at the step 65, and then at the step 66 terms of the contract given by the contract information 40 in the contract information storage 52 are checked against prescribed conditions for allowing reception of this program. Whether all the conditions for the reception of the program are satisfied by this contract, in other words, whether this contract is valid for receiving this program, is determined at the step 67. If all the conditions are satisfied, the scrambled program is de-scrambled at the step 68 so that the program can be received, whereas otherwise the process terminates so that the program remains scrambled.

Such a conventional system of contract-based scramble type broadcasting has a phloem that because the contract information 40 is stored after being deciphered from the cryptogrammed form, the stored contract information 40 may be read out and altered rather easily, so that illegitimate receptions cannot be prevented very effectively.

SUMMARY OF THE INVENTION

It is therefore an object of the present invention to provide a method and an apparatus for scramble type broadcast receiving capable of proper contract management and strict prevention of illegitimate program receptions.

Another object of the present invention is to provide a method and an apparatus for scramble type broadcasting system capable of proper contract management and strict prevention of illegitimate program receptions.

According to one aspect of the present invention there is provided an apparatus for receiving broadcast which utilizes cryptogrammed contract information indicating the status of a contract held by an owner of the apparatus, program information indicating information related to an actual program, and scrambled actual program of the broadcast, the apparatus comprising: means for receiving the cryptogrammed contract information, the program information, and the scrambled actual program; means for storing the received cryptogrammed contract information; means for deciphering the stored cryptogrammed contract information whenever the program information is received; means for temporarily storing the deciphered contract information; and means for de-scrambling the scrambled actual program in accordance with the status of the contract indicated by the deciphered contract information.

According to another aspect of the present invention there is provided a broadcast system utilizing cryptogrammed contract information indicating status of a contract held by an owner of the apparatus, program information indicating information related to an actual program, and scrambled actual program of the broadcast, the system comprising: means for producing and transmitting the cryptogrammed contract information, the program information, and the scrambled actual program; means for receiving the cryptogrammed contract information, the program information and the scrambled actual program; means for storing the received cryptogrammed contract information; means for deciphering the stored cryptogrammed contract information whenever the program information is received: means for temporarily storing the deciphered contract information: and means for de-scrambling the scrambled actual program in accordance with the status of the contract indicated by the deciphered contract information.

According to another aspect of the present invention there is provided a method of receiving a broadcast which utilizes cryptogrammed contract information indicating the status of a contract held by an owner of the apparatus, program information indicating information related to an actual program, and scrambled actual program of the broadcast, the method comprising the steps of: receiving the cryptogrammed contract information, the program information, and the scrambled actual program; storing the received cryptogrammed contract information; deciphering the stored cryptogrammed contract information whenever the program information is received: temporarily storing the deciphered contract information: and de-scrambling the scrambled actual program in accordance with the status of the contract indicated by the deciphered contract information.

According to another aspect of the present invention there is provided a method of broadcasting utilizing cryptogrammed contract information indicating the status of a contract held by an owner of the apparatus, program information indicating information related to an actual program, and scrambled actual program of the broadcast, the method comprising the steps of: producing and transmitting the cryptogrammed contract information, the program information, and the scrambled actual program; receiving the cryptogrammed contract information, the program information, and the scrambled actual program; storing the received cryptogrammed contract information; deciphering the stored cryptogrammed contract information whenever the program information is received: temporarily storing the deciphered contract information: and de-scrambling the scrambled actual program in accordance with the status of the contract indicated by the deciphered contract information.

Other features and advantages of the present invention will become apparent from the following description taken in conjunction with the accompanying drawings.

DETAILED DESCRIPTION OF THE PREFERRED EMBODIMENTS

Figure 4:
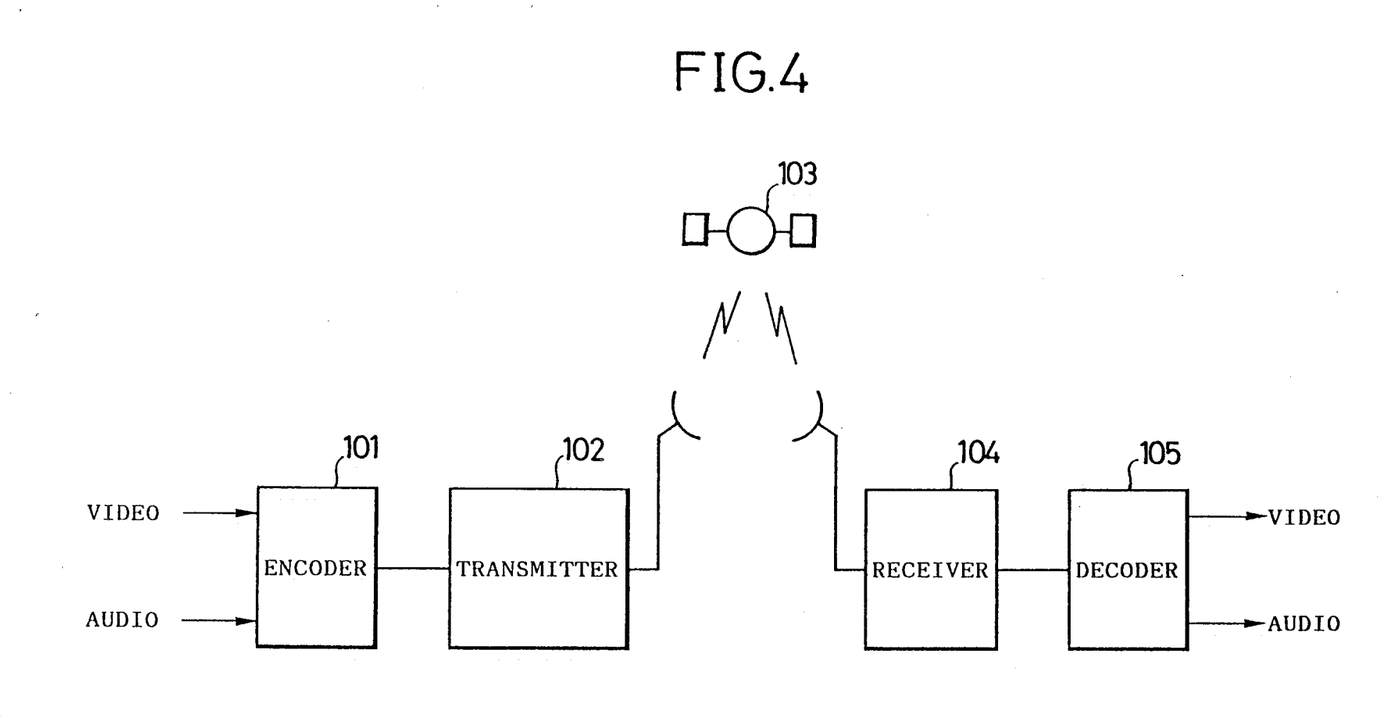
FIG. 4 is a schematic diagram of one embodiment of a contract-based scramble type broadcasting system according to the present invention.

Referring now to FIG. 4, there is shown one embodiment of a contract-based scramble type broadcasting system according to the present invention.

In this contract-based scramble type broadcasting system, both video signals and audio signals are converted into codes by an encoder 101, and these coded video and audio signals are transmitted from a transmitter 102 at a land-based broadcast station, through a satellite station 103. The coded video and audio signals are then received by a receiving unit comprised of a receiver 104 and a decoder 105 at the location of a contract holder, which are subsequently decoded into video and audio information by a decoder 105 accompanying the receiver 104.

Figure 5:
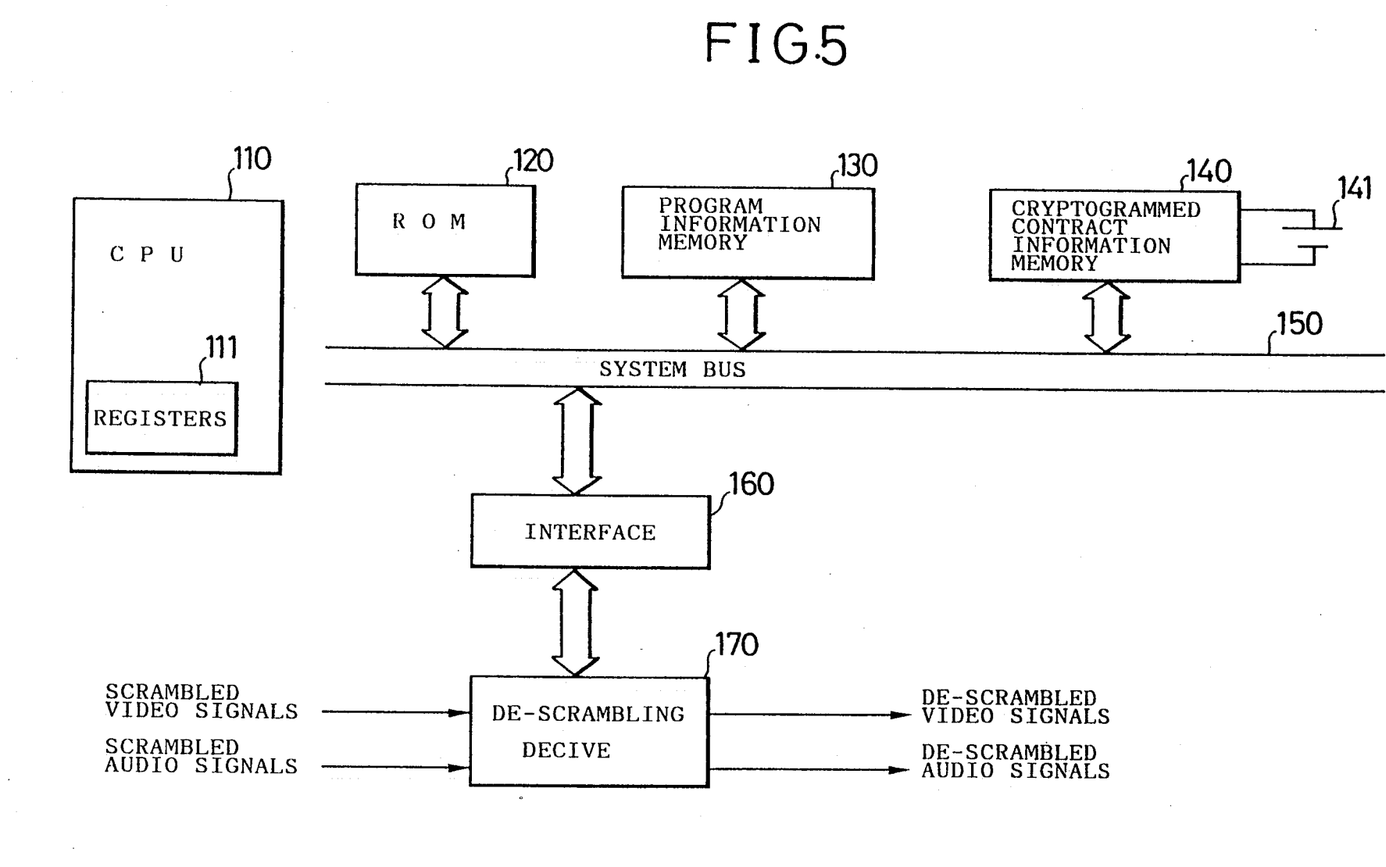
FIG. 5 is a schematic block diagram of one embodiment of a contract-based scramble type broadcast receiving unit according to the present invention, to be incorporated in the broadcasting system of FIG. 4.

Further details of this contract-based scramble type broadcast receiving unit are shown in FIG. 5.

This receiving unit comprises a CPU 110 including registers 111 for carrying out contract management and other operations of the receiving unit, a ROM 120 for memorizing information for controlling the CPU 110, a program information memory 130 for storing program information in the broadcast signals, a cryptogrammed contract information memory 140 backed-up by a battery 141 for storing cryptogrammed contract information, a system bus 150 for interconnecting various components of the receiving unit, an interface 100 for allowing access from external devices to the CPU 110, and a de-scrambling device 170 for de-scrambling the scrambled video and audio signals, making access to the system bus 150 through the interface 160.

Figure 6:
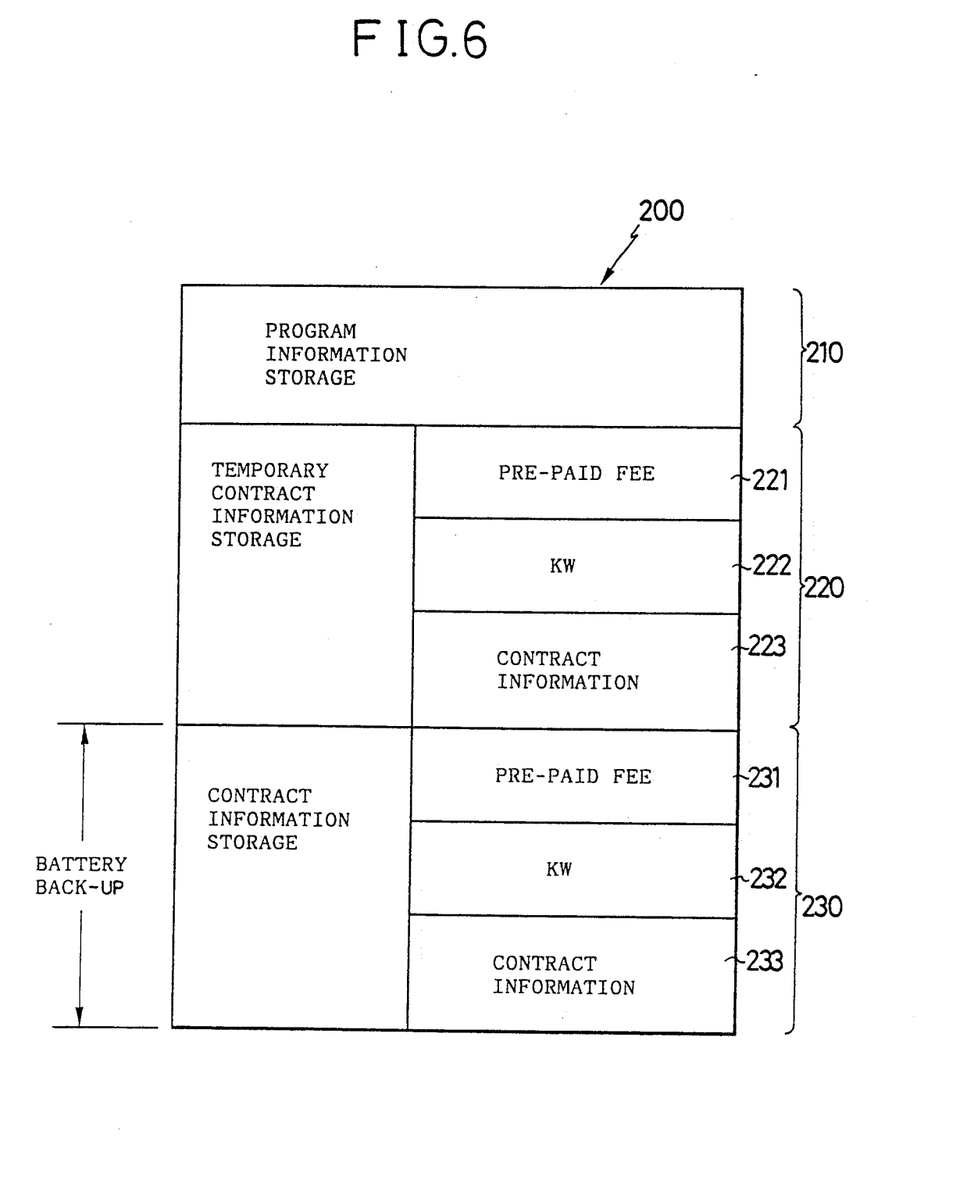
FIG. 6 is a diagrammatic illustration of a memory space to be utilized by the contract-based scramble type broadcast receiving unit of FIG. 5.

The registers 111 in the CPU 110 will be utilized as a temporary storage for deciphered contract information, so that a relevant memory space 200 shown in FIG. 6 of this receiving unit comprises program information storage 210 provided by the program information memory 130, temporary contract information storage 220 containing a room 221 for the pre-paid fee, a room 222 for the program key Kw, and a room 223 for the contract information, provided by the registers 111, and a contract information storage 230 containing a room 231 for the pre-paid fee, a room 232 for the program key Kw, and a room 233 for contract information, provided by the cryptogrammed contract information memory 140. As indicated in FIG. 6, the contract information storage 230 is battery backed-up by the battery 141 so that the contract information 40 will not be lost accidentally.

In this embodiment, the contract information is normally stored in cryptogrammed form at the contract information storage 230, and deciphering of this cryptogrammed contract information takes place only when it becomes necessary. The deciphered contract information is stored at the temporary contract information storage 220 which will be purged as soon as the contract information is used.

Figure 7:
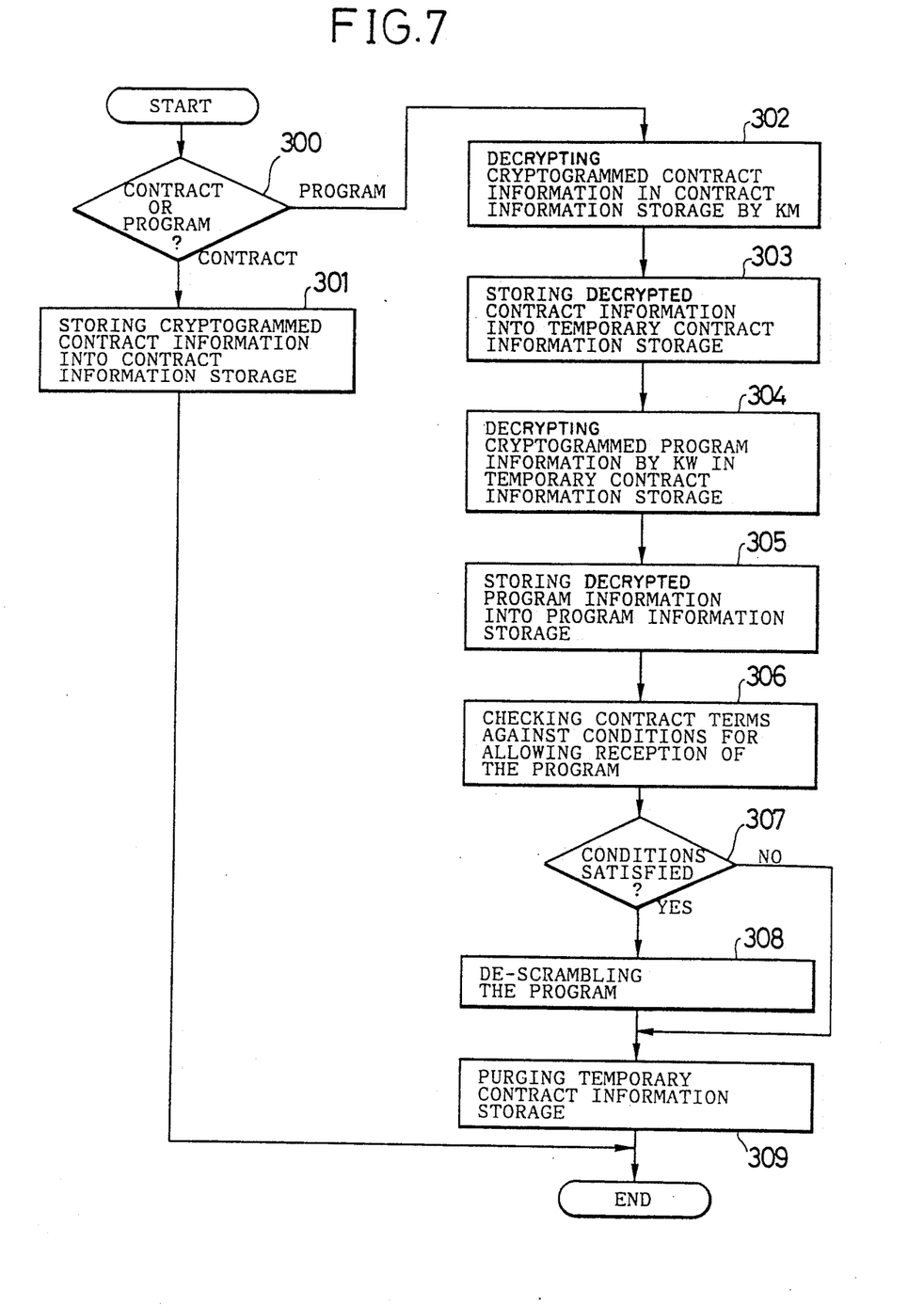
FIG. 7 is a flow chart for the operation of contract management by the contract-based scramble type broadcast receiving unit of FIG. 5.

A flow chart for such a process of contract management by this embodiment of the receiving unit is shown in FIG. 7.

First, at the step 300, the program information and the contract information in the received related packet information are distinguished from each other.

For the contract information, the step 301 will be taken next at which the cryptogrammed contract information is stored into the contract information storage 230, and the process terminates.

On the other hand, for the program information, the step 302 will be taken next at which the cryptogrammed contract information in the contract information storage 230 is deciphered by the pre-installed program key Km. The deciphered contract information is then stored into the temporary contract information storage 220 at the step 303. Then at step 304 the cryptogrammed program information is deciphered by the program key Kw in the temporary contract information storage 220. The deciphered program information is then stored into the program information storage 210 at the step 305. Next at the step 306 terms of the contract given by the contract information in the temporary contract information storage 220 are checked against prescribed conditions for allowing reception of this program. Whether all the conditions for the reception of the program are satisfied by this contract, in other words, whether this contract is valid for receiving this program, is determined at the step 307. If all the conditions are satisfied, the scrambled program is de-scrambled at the step 308 so that the program can be received, and the temporary contract information storage 220 is immediately purged at the step 309, whereas otherwise the process proceeds directly to the step 309, bypassing de-scrambling step of the step 308 and terminates so that the program remains scrambled.

It is to be noted that the registers 111 which provides the temporary contract information storage 220 are internal portions of the CPU 110 to which an access cannot be made externally, even through the interface 160. Thus, according to this embodiment, the contract information is normally stored in incomprehensible cryptogrammed form at the contract information storage 230, and when the deciphering of the cryptogrammed contract information occurs the deciphered contract information is stored at the externally inaccessible temporary contract information storage 220 which in addition will be purged as soon as the contract information is used, so that it is virtually impossible to read out and alter the contract information every time the program information is received, which happens in every second or so, and consequently the strict prevention of the illegitimate program receptions can be provided.

Figure 8:
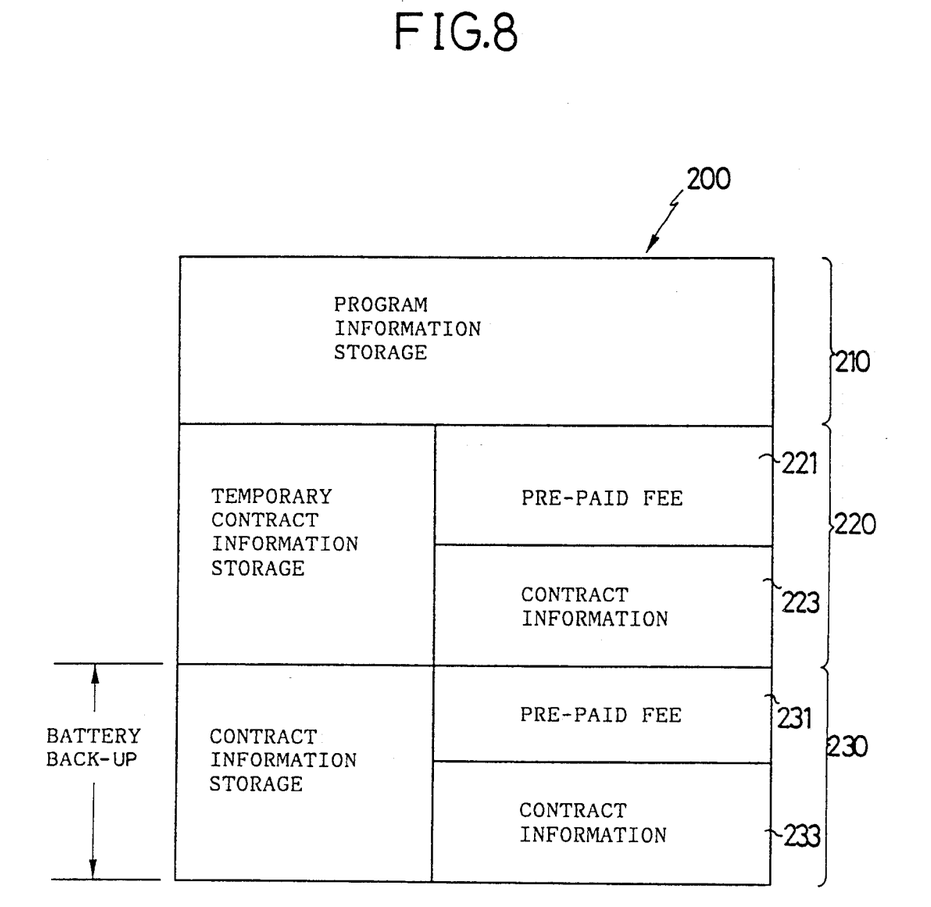
FIG. 8 is a diagrammatic illustration of one variation of a memory space to be utilized by the contract-based scramble type broadcast receiving unit of FIG. 5.
Figure 9:
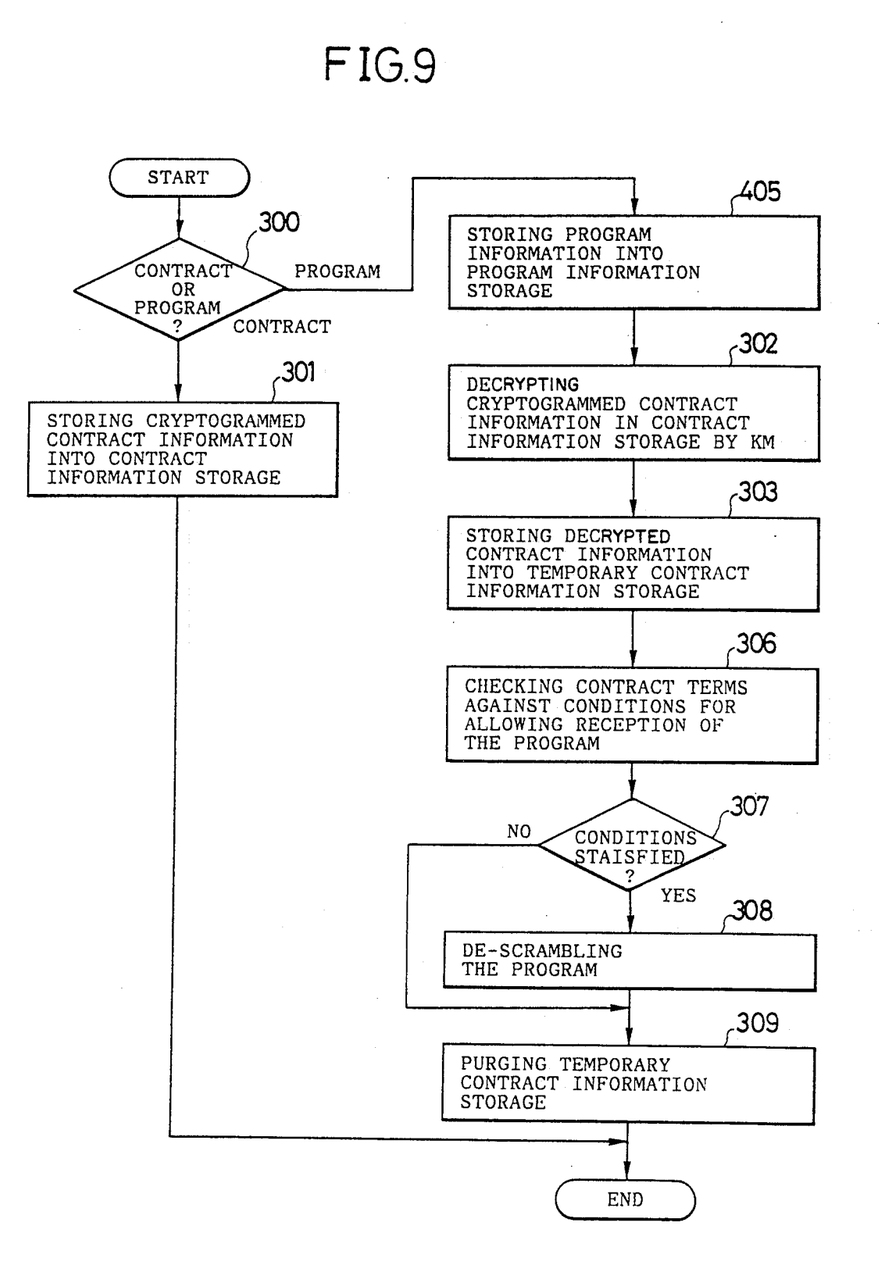
FIG. 9 is a flow chart for one variation of the operation of contract management by the contract-based scramble type broadcast receiving unit of FIG. 5.

Referring now to FIGS. 8 and 9, one variation of the operation of the contract management operation explained above will be described. Here, those steps which have an equivalent counterpart in the operation explained above will be given the same name and label in the figures as in the above, and their description will not, in general, be repeated.

This variation of the contract management operation concerns with a case in which the program information is transmitted and received without ever being cryptogrammed. In such a case, since there is no need to decipher the cryptogrammed program information as the program information is not cryptogrammed, there is no room for the program key Kw in both the temporary contract information storage 220 and the contract information storage 230, as shown in FIG. 8. The other parts of the memory space 200 are the same as that in FIG. 6.

Accordingly, in the flow chart of the contract management operation in this case shown in FIG. 9, instead of the steps 304 and 305 in the previous case the step 405 is provided before the step 302, at which the program information is directly stored into the program information storage 210. The remaining steps of this flow chart of FIG. 9 are identical to those in FIG. 7.

Figure 10:
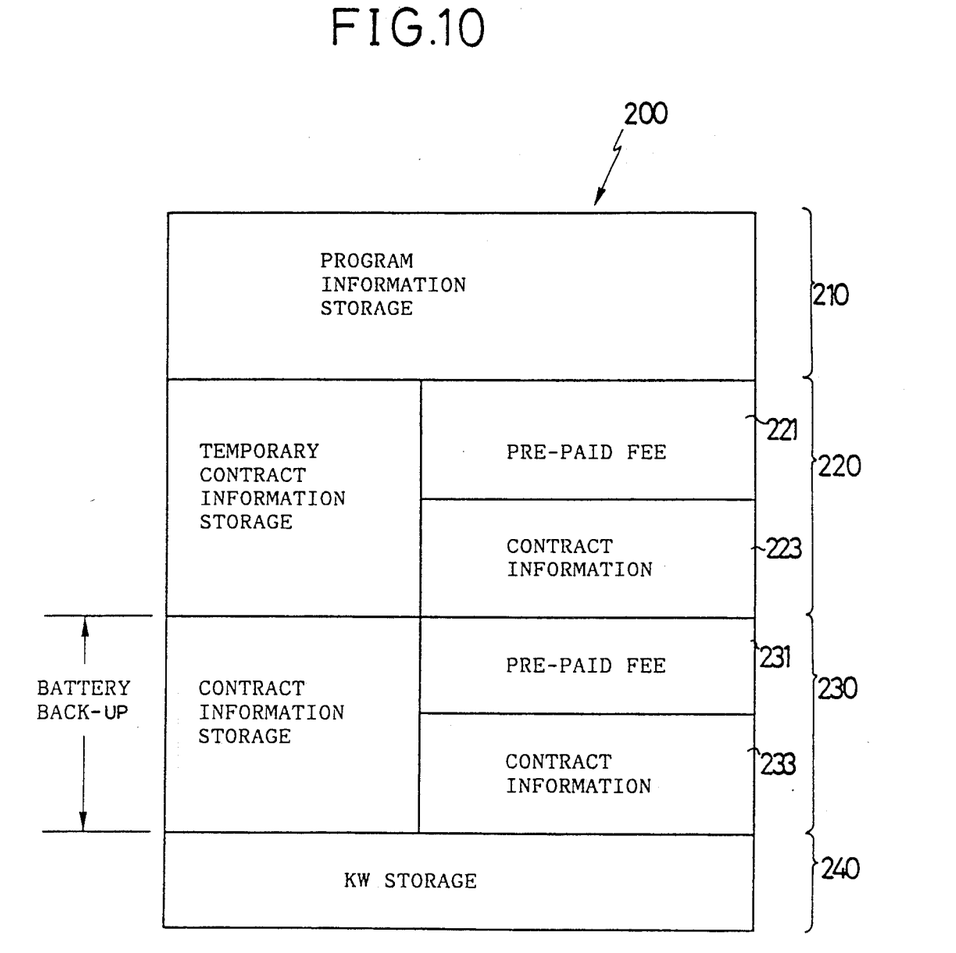
FIG. 10 is a diagrammatic illustration of another variation of a memory space to be utilized by the contract-based scramble type broadcast receiving unit of FIG. 5.
Figure 11:
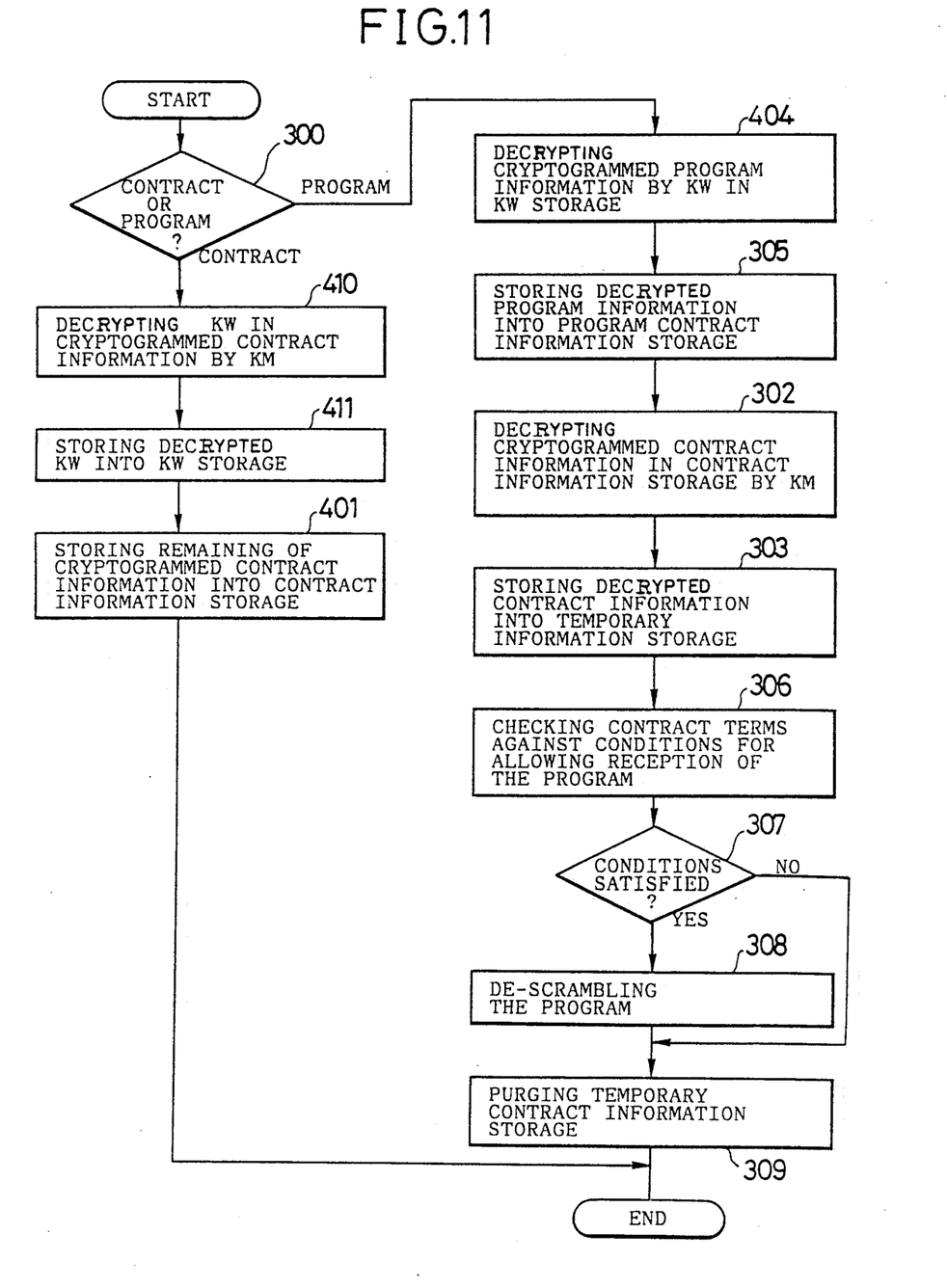
FIG. 11 is a flow chart for another variation of the operation of contract management by the contract-based scramble type broadcast receiving unit of FIG. 5.

Referring now to FIGS. 10 and 11, another variation of the operation of the contract management operation explained above will be described. Here, again, those which has an equivalent counterpart in the operation explained above will be given the same name and label in the figures as in the above, and their description will not in general be repeated.

This second variation of the contract management operation concerns with a case in which the program key Kw is also transmitted in a cryptogrammed form, which is deciphered as soon as it is received. Thus, in this case there is no room in the memory space 200 shown in FIG. 10 for the program key Kw in both the temporary contract information storage 220 and the contract information storage 230, as was in FIG. 8, but there is in addition a program key Kw storage 240 for storing the deciphered program key Kw, which is also provided by the cryptogrammed contract information memory 140 backed-up by the battery 141. The other parts of the memory space 200 are the same as that in FIG. 6.

Accordingly, in the flow chart of the contract management operation in this case shown in FIG. 11, instead of the step 301 in the previous cases the steps 410. 411 and 401 are provided for the contract information. Namely, after the program information and the contract information in the received related packet information are distinguished from each other at the step 300, for the contract information the step 410 will be taken next at which the cryptogrammed program key Kw is deciphered by the pre-installed program key Km. The deciphered contract information is then stored into the program key Kw storage 240 at the step 411, and the remaining of the cryptogrammed contract information is stored into the contract information storage 230 at the step 401. Also, instead of step 304 in the above at which the cryptogrammed program information is deciphered by the program key Kw in the temporary contract information storage 220, there is the step 404 at which the cryptogrammed program information is deciphered by the program key Kw in the program key Kw storage 240. The remaining steps of this flow chart of FIG. 9 are identical to those in FIG. 7.

As explained, according to the present invention, the contract information is normally stored in incomprehensible cryptogrammed form at the contract information storage 230, and when the deciphering of the cryptogrammed contract information occurs, the deciphered contract information is stored at the externally inaccessible temporary contract information storage 220 which in addition will be purged as soon as the contract information is used, so that it is virtually impossible to read out and alter the contract information every time the program information is received, which happens in every second or so, and consequently the strict prevention of the illegitimate program receptions can be provided.

It is to be noted that although in the above description the step 309 of purging the temporary contract information storage 220 immediately after the use of the contract information is included for the sake of providing more thoroughgoing protection against illegitimate program receptions, considering the fact that, as already mentioned above, the program information is usually received in every second or so, an ample protection against illegitimate program receptions may be achieved without this feature of the above embodiment, since the temporary contract information storage will be overwritten in every second or so which by itself makes it extremely difficult to read out and alter the contract information every time the program information is received.

Besides this, many modifications and variations of the above embodiment may be made without departing from the novel and advantageous features of the present invention. Accordingly, all such modifications and variations are intended to be included within the scope of the appended claims.

What is claimed is:

1. An apparatus for receiving a broadcast which utilized cryptogrammed contract information indicating the status of a contract held by an owner of the apparatus, program information indicating information related to an actual program, and a scrambled actual program of the broadcast, the apparatus comprising:
   means for receiving the cryptogrammed contract information, the program information, and the scrambled actual program;
   means for decrypting the stored cryptogrammed contract information whenever the program information is received;
   means for de-scrambling the scrambled actual program in accordance with the status of the contract indicated by the decrypted contract information; and
   means for memorizing the decrypted contract information until the scrambled actual program is de-scrambled by the de-scrambling means.

2. The apparatus of claim 1, further comprising means for purging the memorizing means immediately after the decrypted contract information is used by the de-scrambling means, before next reception of the program information.

3. The apparatus of claim 1, wherein the memorizing means is provided by registers in a CPU.

4. The apparatus of claim 2, wherein the memorizing means is provided by registers in a CPU.

5. A broadcast system utilizing cryptogrammed contract information indicating status of a contract held by an owner of the apparatus, program information indicating information related to an actual information, and a scrambled actual program of the broadcast, the system comprising:
   means for producing and transmitting the cryptogrammed contract information, the program information, and the scrambled actual program;
   means for storing the received cryptogrammed contract information;
   means for decrypting the stored cryptogrammed contract information whenever the program information is received;
   means for de-scrambling the scrambled actual program in accordance with the status of the contract indicated by the decrypted contract information; and
   means for memorizing the decrypted contract information until the scrambled actual program is de-scrambled by the de-scrambling means.

6. The system of claim 5, further comprising means for purging the memorizing means immediately after the decrypted contract information is used by the de-scrambling means, the before next reception of the program information.

7. The system of claim 5, wherein the memorizing means is provided by registers in a CPU.

8. The system of claim 6, wherein the memorizing means is provided by registers in a CPU.

9. A method of receiving broadcast which utilizes cryptogrammed contract information indicating status of a contract held by an owner of the apparatus, program information indicating information related to an actual program, and scrambled actual program of the broadcast, the method comprising the steps of:
   receiving the cryptogrammed contract information, the program information, and the scrambled actual program;
   storing the received cryptogrammed contract information;
   decrypting the stored cryptogrammed contract information whenever the program information is received;
   de-scrambling the scrambled actual program in accordance with the status of the contract indicated by the decrypted contract information; and
   memorizing the decrypted contract information until the scrambled actual program is de-scrambled at the de-scrambling step.

10. The method of claim 9, further comprising the step of purging the temporarily storing means immediately after the deciphered contract information is used by the de-scrambling means, before next reception of the program information; and
   memorizing the decrypted contract information until the scrambled actual program is de-scrambled at the de-scrambling step.

11. The method of claim 9, wherein the memorizing means is provided by registers in a CPU.

12. The method of claim 10, wherein the memorizing means is provided by registers in a CPU.

13. A method of broadcasting utilizing cryptogrammed contract information indicating the status of a contract held by an owner of the apparatus, program information indicating information on an actual program, and a scrambled actual program of the broadcast, the method comprising the steps of:

producing and transmitting the cryptogrammed contract information, the program information, and the scrambled actual program;

receiving the cryptogrammed contract information, the program information, and the scrambled actual program;

storing the received cryptogrammed contract information;

decrypting the stored cryptogrammed contract information whenever the program information is received:

de-scrambling the scrambled actual program in accordance with the status of the contract indicated by the decrypted contract information; and memorizing the decrypted contract information until the scrambled actual program is de-scrambled at the de-scrambling step.

14. The method of claim 13, further comprising the step of purging the memorizing means immediately after the decrypted contract information is used by the de-scrambling means, before the next reception of the program information.

15. The method of claim 13, wherein the memorizing means is provided by registers in a CPU.

16. The method of claim 14, wherein the memorizing means is provided by registers in a CPU.

* * * * *